Feb. 10, 1942.     T. D. NATHAN     2,272,811

SEALING STRUCTURE

Filed Sept. 14, 1937

Inventor
Tracy D. Nathan
By Willis F. Avery
Atty

Patented Feb. 10, 1942

2,272,811

UNITED STATES PATENT OFFICE 2,272,811

SEALING STRUCTURE

Tracy D. Nathan, Akron, Ohio, assignor to The B. F. Goodrich Company, New York, N. Y., a corporation of New York Application September 14, 1937, Serial No. 163,812

11 Claims. (Cl. 285—163)

This invention relates to sealing structures for joints, and is especially useful to seal the joints between pipe sections conducting fluids under high pressure.

The principal objects of the invention are to provide sealing structures of simple construction, to provide effective sealing against high pressures, to provide automatic alignment of the sealed members, to provide for convenience in the assembling procedure, to provide automatic adjustment of the sealed members to variations of temperature and pressure, and to provide security against line pull or other forces tending to separate the sealed members at the joint.

Other objects are to provide ease of assembly under the most unfavorable conditions, such as in crowded space, under water, or where access to the members is otherwise inconvenient, and to eliminate bolts or other rigid fastening means requiring the use of tools.

These and other objects will appear from the following description and the accompanying drawing illustrating embodiments of the invention, it being understood that the invention may be embodied in various forms without departing from the scope of the invention as it is defined in the appended claims.

Figure 1:
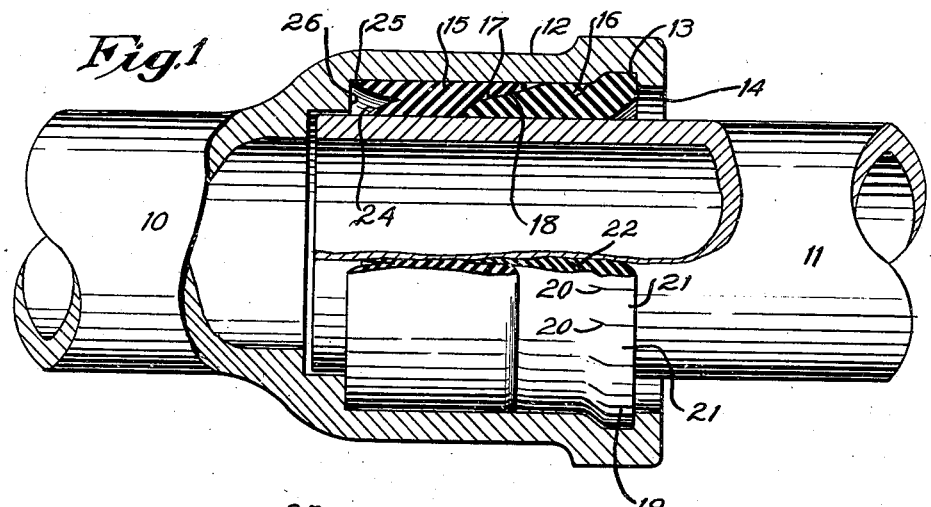
Fig. 1 is a side view of a pair of contiguous pipe members, shown as partly broken away and partly in section, with the sealing means comprising one embodiment of the invention in operative position therebetween, the sealing means being also shown as partly broken away and partly in section.

Referring to the drawing, in the form of the invention illustrated in Fig. 1, the numerals 10, 11 designate contiguous conduit members, the member 10 being formed with a bell 12 of the usual form, having a lead-lock groove 13 and an inwardly turned retaining shoulder 14 defining the outer margin thereof. Seated in the annular space between the bell of the pipe 10 and the spigot end of the pipe 11 are an annular sealing member 15 and an annular retaining and sealing member 16, each of which is formed of flexible or deformable and preferably resilient material, such as soft vulcanized rubber or suitable substitutes, such, for example, a Neoprene or polymerized vinyl halide composition.

The members 15 and 16 are formed with cooperating adjacent surfaces, preferably correspondingly bevelled. In Fig. 1 these surfaces are the inclined surface 17 of the member 15 and the inclined surface 18 of the retaining member 16. These surfaces are adapted to engage each other to provide a wedging action under the force of the fluid pressure, which presses one of the members against the wall of one of the conduit members and the other against the wall of the other member, such movement being permitted by the flexible nature of the rings.

Figure 2:
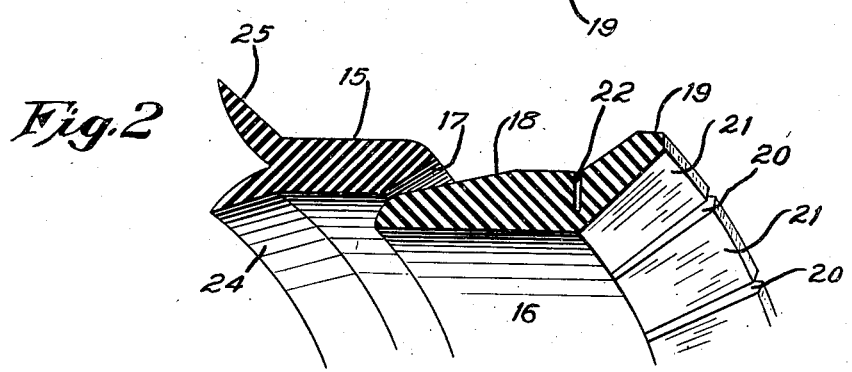
Fig. 2 is a perspective view of a slightly modified sealing structure suitable for use in the joint of Fig. 1, the sealing means being shown as partly broken away and partly in section in the unstressed condition prior to assembly in the joint.

To provide for holding the retaining ring 16 in place in the bell, the margin of the ring adjacent the mouth of the bell preferably is offset outwardly to provide an annular ridge 19, and the edge face adjacent thereto is inclined so as to provide space for deflection of the ridge toward the spigot when the retaining ring 16 is forced into the bell. The ridge is adapted to snap into the lead-lock groove 13 and to abut against the inturned retaining shoulder 14 when the ring is in place. To facilitate further the passing of the ridged margin 19 into the lead-lock groove 13, such margin may be divided by axially and radially disposed slots 20, 20, into a series of fingers 21, 21. The stiffness of the ring may be further lessened where the fingers are attached to its body by an annular groove 22 extending partially through the body of the ring as in the modification shown in Fig. 2, the slots 20 preferably communicating with the groove 22. Except for the groove 22, the construction of Fig. 2 is the same as that of Fig. 1. This construction permits the placing of the retaining ring in the space between the spigot and the bell without the exertion of great force and without the use of special tools, it being possible to insert the ring by hand, and a strong resistance to forces tending to move the ring axially out of the annular space is nevertheless provided.

Figure 4:
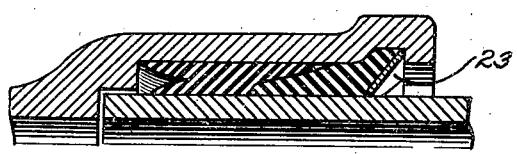
Fig. 4 is a further modification of the invention as applied to a bell and spigot joint, the joint being shown as in section and partly broken away.

In order to provide greater resistance to undesirable displacement of the retaining ring outwardly of the bell, the fingers 21 may be formed of a stiffer composition than the body of the ring or they may be reinforced by plates of metal 23, as shown in Fig. 4, preferably vulcanized to their inclined surfaces and disposed in moving-strut fashion to provide the resistance to movement; that is, these plates 23 are disposed and engageable with the bell and spigot members in an oblique manner such that each rests inclined to the axis of the pipe member with its outer end against the shoulder 14 of the bell and its heel against the spigot, whereby engagement of the metal members in the groove of the bell and with the wall of the spigot prevents movement of the spigot outwardly of the bell and provides a secure anchorage of the retaining ring. Alternatively, the increased resistance may be supplied by other reinforcements incorporated in this portion of the ring 16.

The sealing ring 15 is preferably formed at one of its rear margins with a lip 24, inclined radially inward, of small enough circumference to hug the spigot, and an outwardly inclined lip 25 of large enough circumference to bear against the wall of the bell, both lips being of resilient rubber-like material so as to provide an effective lip-sealing action. The outer lip 25 is preferably made longer than the inner lip so as to abut against a shoulder 26 defining the inner extent of the bell and thereby to space the inner lip well away from the end of the spigot where it will not be damaged by being crushed between the spigot and the bell or have its sealing effectiveness lessened.

In assembling the joint, the sealing ring 15 may be flexed inwardly at one part of its periphery to reduce its apparent circumference and due to its pliable nature may be passed into the bell where it will tend to recover its original shape. The spigot may then be shoved into place and the retaining ring, which has been placed over the spigot, may then be advanced into the bell until its margin engages in the lead-lock groove. As an optional method both rings may be inserted in the bell first and the spigot then shoved therethrough into place. A lubricating solution may be applied to the surfaces to reduce friction in assembling the parts. Where the joint is assembled under water, as in a ditch, the water alone will act as a sufficient lubricant. After the joint is assembled, then the line is put under pressure, and the lips 24, 25 will initially seal the joint and the internal fluid pressure applied to the sealing ring will cause it to move toward the retaining ring. The inclined surface 17, 18 will permit one ring to move with relation to the other providing a wedging action serving also to seal the wedge members against the pipe members which action will increase as the pressure increases. This wedging action alone is effective to provide a good seal, but it is preferred to use also the sealing lips 24, 25 for maximum effectiveness both as to the additional sealing at the lips and as to utilizing the fluid pressure to best advantage in obtaining the wedging action.

Figure 3:
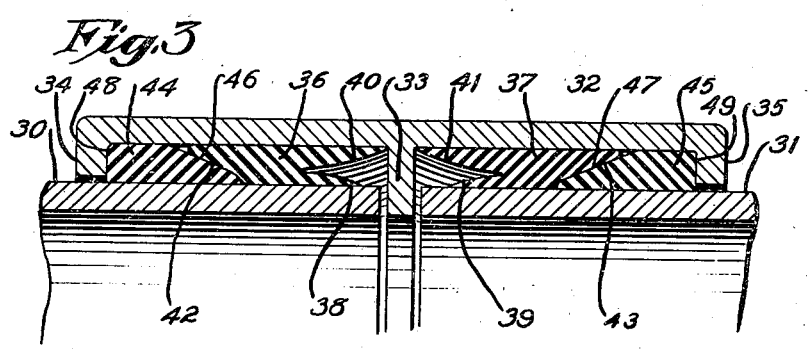
Fig. 3 is another modification of the invention suitable for use on straight end pipe members, the sealing means being shown in operative position with respect to the pipes, both the sealing structure and the pipes being shown as partly in section.

In the form of the invention illustrated in Fig. 3 a pair of plain end pipes 30, 31 are inserted in a sleeve 32 which may have a spacing fence 33 at its center and inwardly turned flanges 34, 35 at its ends. The sealing members 36, 37 are identical to that previously described, being formed likewise of deformable or flexible material preferably resilient rubber-like material such as vulcanized soft rubber or suitable substitutes therefor such as Neoprene or polymerized vinyl halide compositions, and having inwardly inclined lips 38, 39, outwardly inclined lips 40, 41, and inclined marginal surfaces 42, 43. Where, however, the sleeve is supplied with the inwardly turned retaining flanges 34, 35, the retaining and sealing rings 44, 45 need not be supplied with locking ridges or fingers, the retaining rings being of rubber-like deformable resilient material so as to be contracted or expanded readily and being formed with inclined faces 46, 47 to cooperate with the inclined faces of the sealing rings 36, 37 and the opposite faces 48, 49 being merely plain radial surfaces to engage against the shoulders 34, 35, the latter preferably terminating close to the pipe sections 30, 31 to assure a strong endwise abutment for the retaining rings.

Both sets of rings 44, 45 and 36, 37 may be inserted in the sleeve before the pipe sections are entered therein, and the pipe sections are merely pressed into place, a lubricant being preferably used to reduce friction in assembling the parts.

In any of the forms of the invention a double seal is provided by the lip sealing action of the sealing rings and wedging action of the tapered rings against each other at higher pressures whereby the sealing members become more firmly packed in the joint by pressure directly applied to the sealing rings by the fluid pressure within the pipes.

The absence of bolts or other clamping members provides simplicity of construction and simplifies assembly of the pipes, eliminating the use of wrenches and other tools and permitting assembly in close spaces or under water.

As all forces applied to the sealing and retaining rings are compression forces, security and long life of the sealing members are assured. The rubber members are well protected from oxidation and sunlight by being almost completely enclosed and sealed against the metal parts. The deformable and resilient nature of the sealing members provides for efficient sealing regardless of the irregularities in the surfaces of the metal parts or variations in the dimensions or shape of the pipes.

While the invention has been illustrated in its preferred forms, it is obvious that other forms of the device may be made without departing from the scope of the invention.

I claim:

1. A fluid-seal pipe-joint assembly comprising an inner pipe member, an outer pipe member surrounding the inner member and therewith defining an annular space, a resilient gasket mounted in said space having one end of the gasket exposed to the fluid-pressure and the other end provided with a wedge face, said gasket at its fluid-pressure contacting end being provided with tapered lips pressing resiliently against said pipe members, and a wedge gasket of resilient material held against movement outwardly of the space and engageable with the wedge face of the first said gasket so that axial movement of the first said gasket as a result of the fluid pressure against it causes a wedging of the gaskets against each other and the pipe members.

2. A fluid-seal pipe joint assembly as defined in claim 1 in which the outer pipe member comprises an annular shoulder at the outer portion of the space and the second said gasket is held against movement outwardly of the space by a plurality of strut members at its forward end of greater length than the radial dimension of said space disposed with one end of each against said shoulder and the other end of each against the inner pipe member to constitute abutments for the gasket.

3. A pair of fluid-pressure sealing gaskets for the annular joint space between inner and outer pipe members, one of said gaskets being a retaining gasket adapted to abut at its forward end against an abutment in the joint to resist outward movement of both gaskets as a result of fluid-pressure against the other gasket, the retaining gasket comprising a body of resilient rubber-like material and having a wedge surface at its rear end, the other said gasket being of resilient rubber-like material and having a wedge face at its forward end cooperable with the wedge surface of the retaining gasket and inner and outer lips at its rear end adapted to engage the pipe members, the outer lip projecting rearward and radially outward and the inner lip projecting rearward and radially inward of said body and both lips tapering to fine edges adapted to bear against the pipe members upon flexure of the lips against the members to bar the pressure fluid and utilize the same to force the gasket forwardly against the retaining gasket.

4. A pair of fluid-pressure sealing gaskets as defined in claim 3 in which the retaining gasket comprises a plurality of strut members at its forward end of greater length than the radial dimension of the joint space.

5. A fluid-seal pipe joint assembly, comprising the combination with inner and outer pipe members defining between them an annular space communicating with pressure of fluid in the pipe, complementary substantially wedge-shaped resilient sealing rings occupying the said annular space, means for wedging the said sealing rings against each other and against the said pipe members responsively to pressure of fluid against the rings, thereby maintaining continuously a tight seal between the rings and the pipe members while permitting changes in relative position between the pipe members, and means on one of the said pipe members defining ring-retaining recesses for retaining the rings in continuous engagement with each other and with the pipe members.

6. A fluid-seal pipe joint assembly, comprising, in combination, an inner pipe member, an outer pipe member, the pipe members defining an annular space between them communicating with pressure of fluid flowing through the pipe members, an annular retaining rim at each end of the annular space, cooperating resilient wedge-acting packing means within the annular space abutting against the retaining rims and held in position thereby and also engaging the pipe members, and means for leading fluid from the pipe members into pressure engagement with the packing means for forcing the said means into complete sealing position.

7. A fluid-seal pipe joint assembly comprising, in combination, an inner pipe member, an outer pipe member, the pipe members defining an annular space between them communicating with pressure of fluid flowing through the pipe members, the outer member being provided with shoulders at each end of the annular space, a plurality of resilient packing means within said space bearing against and limited in position by said shoulders, the parts thereof being so proportioned and arranged that under action of fluid pressure within the pipe line, said resilient packing means are driven more firmly into position.

8. A flexible spigot and bell joint comprising, a spigot member and a bell member defining between them an annular recess communicating with the interior of the said members, a plurality of cooperating resilient gasket members positioned in said recess, the innermost of said gasket members including an annular recess communicating with the interior of said joint and being movable in response to pressure from fluid therein, and means integral with said bell member for retaining the outermost of said gasket members in relatively fixed position.

9. A fluid-seal pipe-joint assembly comprising an inner pipe member, an outer pipe member surrounding the inner member and therewith defining an annular space, a resilient axially-elongated gasket mounted in said space having one end of the gasket exposed to the fluid-pressure and the other end provided with a wedge face, said gasket at its fluid-pressure contacting end being provided with tapered lips pressing resiliently against said pipe members, and a wedge gasket of resilient material held against movement outwardly of the space and wedging the leading end portion of the first said gasket directly between the wedge gasket and a pipe member so that axial movement of the first said gasket as a result of the fluid pressure against it causes a wedging of each gasket between a pipe member and the other gasket.

10. A pair of fluid-pressure sealing gaskets for the annular joint space between inner and outer pipe members, one of said gaskets being a retaining gasket adapted to abut at its forward end against an abutment in the joint to resist outward movement of both gaskets as a result of fluid-pressure against the other gasket, the retaining gasket comprising a body of resilient rubber-like material and having a wedge surface at its rear end, the other said gasket being of resilient rubber-like material comprising an elongated body having a wedge face for wedging its forward end directly between the wedge surface of the retaining gasket and a pipe member and inner and outer lips at its rear end adapted to engage the pipe members, the outer lip projecting rearward and radially outward and the inner lip projecting rearward and radially inward of said body and both lips tapering to fine edges adapted to bear against the pipe members upon flexure of the lips against the members to bar the pressure fluid and utilize the same to force the gasket forwardly against the retaining gasket and pipe member.

11. A pressure-fluid sealing gasket for the annular joint space between inner and outer pipe members to seal the space while the rear end of the gasket is exposed to fluid pressure and the forward end is slidable against a wedge surface in the joint, said gasket being of resilient rubber-like material and comprising an axially elongated body having a wedge face at its front end adapted to engage the wedge surface of the joint for wedging its end between said surface and a pipe member, and inner and outer lips at the rear end of the body adapted to engage the pipe members, the outer lip projecting rearward and radially outward and the inner lip projecting rearward and radially inward from the body, and both lips tapering to fine edges adapted to remain against the pipe members upon flexure of the lips against the members to bar the pressure fluid and utilize the same to force the gasket forwardly against the wedge surface and pipe member.

TRACY D. NATHAN.